US008248233B2

(12) United States Patent
Silverman et al.

(10) Patent No.: US 8,248,233 B2
(45) Date of Patent: Aug. 21, 2012

(54) LOCATION FILTERING BASED ON DEVICE MOBILITY CLASSIFICATION

(75) Inventors: Matthew Aaron Silverman, Richfield, OH (US); Santosh G. Pandey, Santa Clara, CA (US); Brian Donald Hart, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 525 days.

(21) Appl. No.: 12/430,260

(22) Filed: Apr. 27, 2009

(65) Prior Publication Data
US 2010/0271228 A1 Oct. 28, 2010

(51) Int. Cl.
*G08B 1/08* (2006.01)
(52) U.S. Cl. ............ 340/539.13; 340/686.1; 342/357.23; 367/901; 701/214; 701/221
(58) Field of Classification Search ............... 340/686.1, 340/539.13, 988; 455/456.1, 456.3, 456.6; 342/357.23, 357.34; 367/135, 221, 901; 701/214, 220, 221
See application file for complete search history.

(56) References Cited

U.S. PATENT DOCUMENTS

| 5,537,368 | A  | * | 7/1996  | O'Brien et al. | 367/135 |
| 6,518,875 | B2 | * | 2/2003  | DeZorzi | 340/442 |
| 7,860,651 | B2 | * | 12/2010 | Morgan et al. | 701/220 |
| 7,961,145 | B1 | * | 6/2011  | Strus et al. | 342/357.34 |
| 2008/0272961 | A1 | * | 11/2008 | Wirola et al. | 342/357.12 |
| 2009/0174600 | A1 | * | 7/2009  | Mazlum et al. | 342/357.12 |
| 2010/0211315 | A1 | * | 8/2010  | Toda | 701/216 |

* cited by examiner

*Primary Examiner* — Brent Swarthout
(74) *Attorney, Agent, or Firm* — P. Su

(57) ABSTRACT

In one embodiment, a method includes obtaining location information associated with a remote device, and processing the location information. Processing the location information includes determining if the remote device is mobile. The method also includes configuring a filter such that at least one parameter indicates that the remote device is mobile if the remote device is mobile, and configuring the filter such that the at least one parameter indicates that the remote device is approximately stationary if the remote device is not mobile. The filter is applied to the location information to generate a filtered location estimate which is arranged to estimate a location of the remote device.

11 Claims, 6 Drawing Sheets

LOCATION FILTERING BASED ON DEVICE MOBILITY CLASSIFICATION

BACKGROUND OF THE INVENTION

The present invention relates generally to networking.

Radio frequency (RF), or radio frequency identification (RFID), tags are often added to or otherwise incorporated into devices such that the devices may be tracked using RF signals. Due to the time-varying nature of RF signals, the estimated location of a stationary device from which the RF signals are received may vary with time. That is, data pertaining to the estimated location of a stationary device, e.g., an x-coordinate and/or a y-coordinate associated with the current two-dimensional location of the stationary device, may vary with time. As such, it may be difficult to identify the true or actual location of a stationary device.

To compensate for the time-varying nature of RF signals, data pertaining to the estimated location of a stationary device may be filtered. Filtering may also be used on data pertaining to the estimated location of a mobile device such that an actual path traversed by the mobile device may be tracked. However, the time-varying nature of RF signatures still often leads to relatively significant errors in tracking an actual path of a mobile device even if filtering is used.

BRIEF DESCRIPTION OF THE DRAWINGS

The invention will be readily understood by the following detailed description in conjunction with the accompanying drawings in which.

DESCRIPTION OF EXAMPLE EMBODIMENTS

General Overview

According to one aspect of the present invention, a method includes obtaining location information associated with a remote device, and processing the location information. Processing the location information includes determining if the remote device is mobile. The method also includes configuring a filter such that at least one parameter indicates that the remote device is mobile if the remote device is mobile, and configuring the filter such that the at least one parameter indicates that the remote device is approximately stationary if the remote device is not mobile. The filter is applied to the location information to generate a filtered location estimate which is arranged to estimate a location of the remote device.

Description

When the location of devices is tracked, information regarding the estimated location of the devices is often provided, e.g., through a wireless network, by the devices to a location tracing system. The estimated location of the devices may be inaccurate due to measurement noise and other factors.

Filters, e.g., Kalman filters, are often used to reduce measurement noise of location values such as x-position and y-position values of a two-dimensional location of a device. The effectiveness of a filter in reducing measurement noise and, hence, increasing the accuracy of a measurement process, may be improved with the knowledge of whether a device which is tagged with a radio frequency (RF) tag is stationary or mobile. In one embodiment, a filter used in a location-estimating application may effectively be chosen based upon whether a device is stationary or mobile.

Parameters associated with a filter, as well as a filter type, that is used in conjunction with estimating the location of a device may be adjusted based upon whether the device is likely to be stationary or mobile. That is, the estimated state of a tracked device may be used to select parameters for use with a filter that increases the accuracy with which a location of the tracked device may be determined. By way of example, for a Kalman filter, the estimated state of a tracked device may be used to determine a suitable measurement noise covariance parameter and/or a process noise covariance parameter. If a device is determined to be stationary, a measurement noise covariance parameter and/or a process noise covariance parameter may have a first set of values. If, however, a device is determined not to be stationary, then a measurement noise covariance parameter and/or a process noise covariance parameter may have a different set, or sets, of values.

Figure 1:
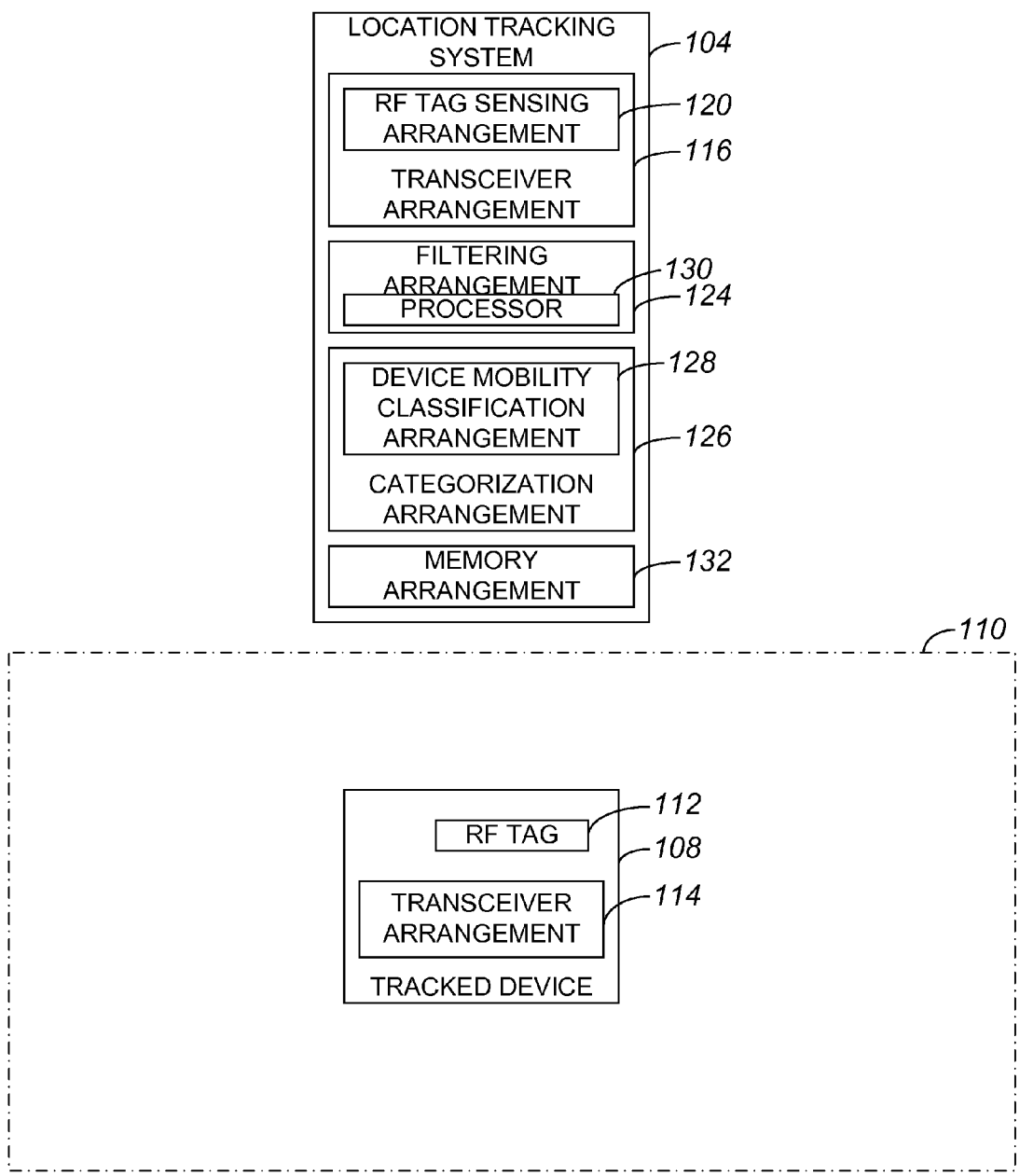
FIG. 1 is a block diagram representation of a network which includes a location tracking system that utilizes a device mobility classification to perform location filtering in accordance with an embodiment of the present invention.

Referring initially to FIG. 1, a network which includes a location tracing system that uses a device mobility classification to perform location filtering will be described in accordance with an embodiment of the present invention. A network 100 may be, in one embodiment, a wireless network in which a location tracking system 104 and at least one tracked device 108 communicate using RF signals. Typically, tracked device 108 is remote with respect to location tracking system 104. Location tracking system 104 may be configured to effectively monitor an area 110 such that a location of tracked device 108 within area 110 may effectively be determined. In the described embodiment, when location tracking system 104 tracks tracked device 108, location tracking system 104 is essentially tracing an RF tag 112 embedded in, attached to, or otherwise incorporated substantially into tracked device 108.

Location tracking system 104 includes a transceiver arrangement 116 configured to transmit and to receive signals that contain information or data. An RF tag sensing arrangement 120 may be included in transceiver arrangement 116, and is generally arranged to monitor RF tag 112. That is, RF tag sensing arrangement 120 may be arranged to obtain information relating to a location of RF tag 112.

Location tracking system 104 also includes a categorization arrangement 126 that is generally arranged to process estimated location information obtained from tracked device 108. Categorization arrangement 126 includes a device mobility classification arrangement 128 which is generally arranged to classify, or effectively determine a state of, tracked device 108. In the described embodiment, device mobility classification arrangement 128 may be configured to identify whether tracked device 108 is likely mobile or stationary at a current time. By way of example, device mobility classification arrangement 128 may execute an algorithm which uses estimated location information obtained by transceiver arrangement 116 to determine whether tracked device 108 is more likely to be mobile or stationary.

A filtering arrangement 124 may obtain estimated location information from transceiver arrangement 116 and a device mobility classification from device mobility classification arrangement 128, and effectively produce filtered location information. That is, filtering arrangement 124 is arranged to use a device mobility classification to produce a relatively accurate determination of a current location of tracked device 108. Filtering arrangement 124 may be associated with any suitable filter including, but not limited to including, a Kalman filter. In general, filtering arrangement 124 may be associated with a processor 130.

Location tracking system 104 also includes a memory arrangement 132 that may store information obtained by transceiver arrangement 116, information used by filtering arrangement 124, and information substantially created by device mobility classification arrangement 128. In general, memory arrangement 132 may include, but is not limited to including, a cache, a data store, a database, and/or any data structure which stores information such that the information may be retrieved.

Tracked device 108 may generally be any device with a location that is of interest to location tracking system 104. In other words, tracked device 108 is a device that is arranged to be substantially tracked by location tracking system 104. As previously mentioned, RF tag 112 is effectively monitored when tracked device 108 is within area 110. Tracked device 108 typically includes a transceiver arrangement 114 that allows tracked device 108 to communicate, e.g., wirelessly, with location tracking system 104.

Figure 2A:
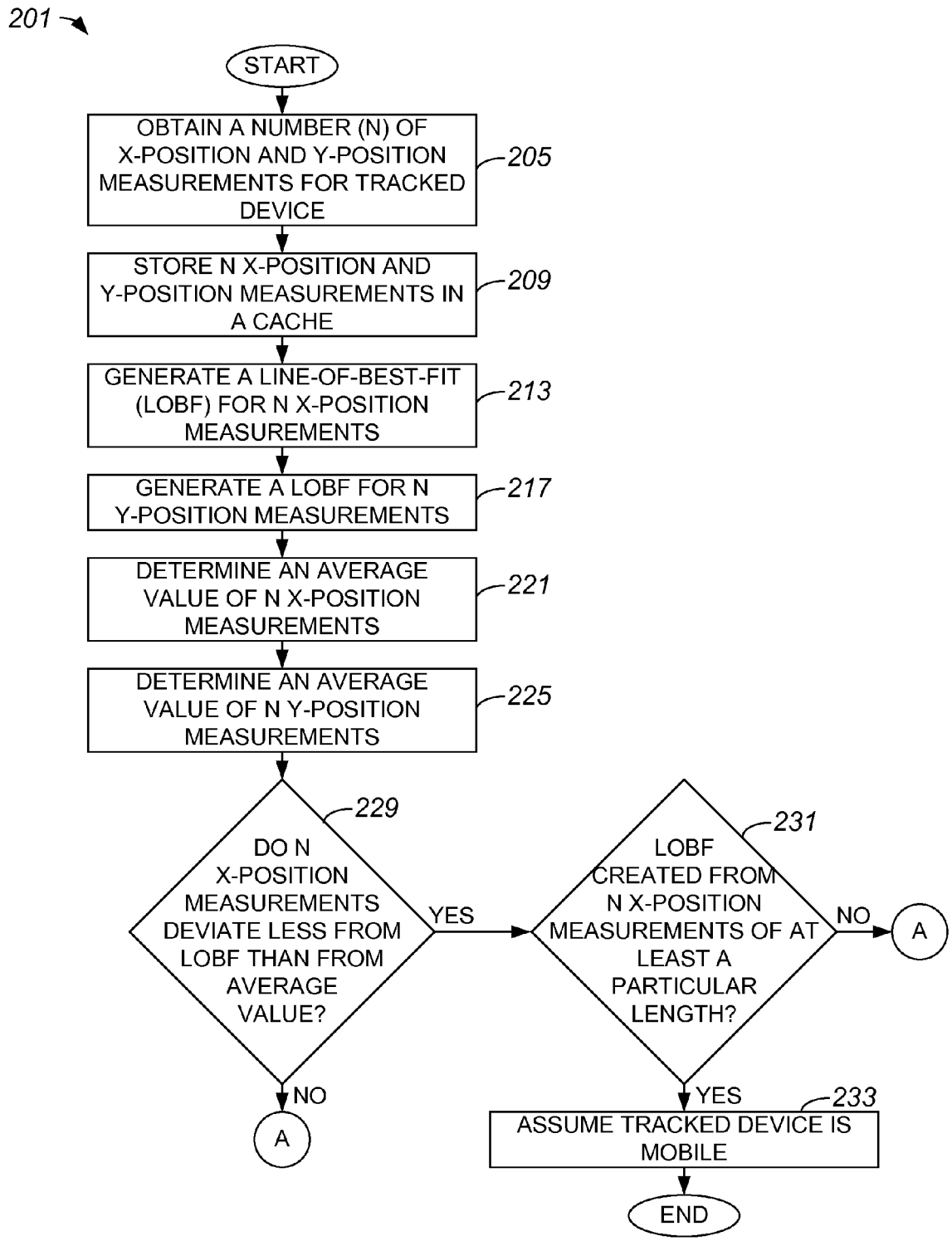
FIGS. 2A and 2B are a process flow diagram which illustrates a general method of classifying a device in accordance with an embodiment of the present invention.
Figure 2B:
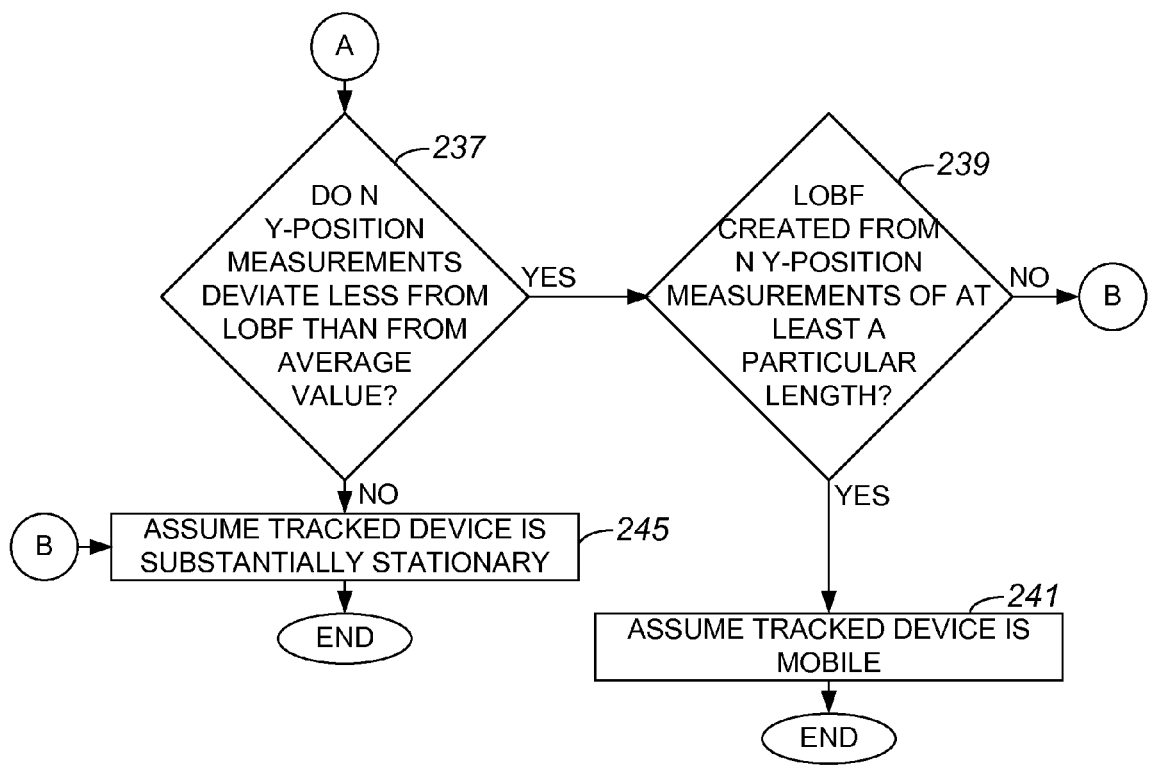

With reference to FIGS. 2A and 2B, a general process of classifying a tracked device, e.g., a device which has an RF tag, as either mobile or stationary will be described in accordance with an embodiment of the present invention. A process 201 of classifying a tracked device begins at step 205 in which a number (N) of x-position and y-position measurements are obtained for a tracked device. The x-position and y-position measurements, or x and y coordinates, may be obtained from RF signals by a location tracking system. Such RF signals may effectively be processed to identify a received signal strength indication (RSSI) or a time difference of arrival (TDOA). N may generally be any suitable number. By way of example, N may be substantially any number that is two or greater. The N x-position and y-position measurements may be the N most recent x-position and y-position measurements obtained for a tracked device. In one embodiment, the N x-position and y-position measurements may be obtained substantially in real-time, although the N x-position and y-position measurements may instead be obtained from a data store or a data buffer. It should be appreciated that although obtaining a two-dimensional position measurement is described, a three-dimensional position measurement may instead be obtained.

Once N x-position and y-position measurements are obtained, the N x-position and y-position measurements may be stored in a cache in step 209. Then, in step 213, a line-of-best-fit (LOBF) may be generated for the N x-position measurements in step 213. An LOBF may be generated in step 217 for the N y-position measurements.

After the LOBFs for the N x-position and y-position measurements are generated, an average value of the N x-position measurements is determined in step 221, and an average value of the N y-position measurements is determined in step 225. A determination is made in step 229 as to whether the N x-position measurements deviate less from the LOBF for the N x-position measurements than from the average value for the N x-position measurements.

If it is determined that the N x-position measurements deviate less from the LOBF than from the average value, the indication is that the tracked device may be mobile, e.g., moving relative to an x-direction in a two-dimensional space. That is, the implication is that the N x-position measurements are more likely to approximate a line than an overall point in space. As such, it is then determined in step 231 whether the LOBF created from the N x-position measurements are of at least a particular length. The particular length may vary depending upon the requirements of a particular location tracking system. If the determination is that the LOBF is of at least the particular length, then the tracked device is assumed to be mobile in step 233, and the process of classifying a tracked device is completed.

Alternatively, if it is determined in step 231 that the LOBF created from the N x-position measurements is not of at least a particular length, the indication is that although the N x-position measurements deviate less from the LOBF than from the average value, the tracked device is likely not mobile at least with respect to an x-direction in a two-dimensional space. Accordingly, process flow moves to step 237 in which it is determined whether the N y-position measurements deviate less from the LOBF created from the N y-position measurements than from the average value of the N y-position measurements. If the determination in step 237 is that the N y-position measurements do not deviate less from the LOBF than from the average value, the tracked device is assumed to be substantially stationary in step 245, and the process of classifying a tracked device is completed.

If, however, the determination in step 237 is that the N y-position measurements do not deviate less from the LOBF than from the average value, the implication is that the tracked device may be mobile at least with respect to a y-direction in a two-dimensional space. As such, process flow moves from step 237 to step 239 in which it is determined whether the LOBF created from the N y-position measurements is of at least a particular length. It should be appreciated that the particular length for the N y-position measurements may be the same or different from the particular length for the N x-position measurements.

When it is determined that the LOBF created from the N y-position measurements is of at least a particular length, the tracked device is assumed to be mobile in step 241. Once the tracked device is assumed to be mobile, the process of classifying a tracked device is completed. Alternatively, when it is determined in step 239 that the LOBF created from the N y-position measurements is not of at least the particular length, process flow moves from step 239 to step 245 in which the tracked device is assumed to be substantially stationary.

Returning to step 229, if the determination is that the N x-position measurements deviate less from the LOBF created from the N x-position measurements than from the average value for the N x-position measurements, the indication is that relative to an x-direction, the N x-position measurements are more consistent with an overall point in space than a line. Accordingly, process flow moves to step 237 and the determination of whether the N y-position measurements deviate less from the LOBF created from the N y-position measurements than from the average value for the N y-position measurements.

Figure 3:
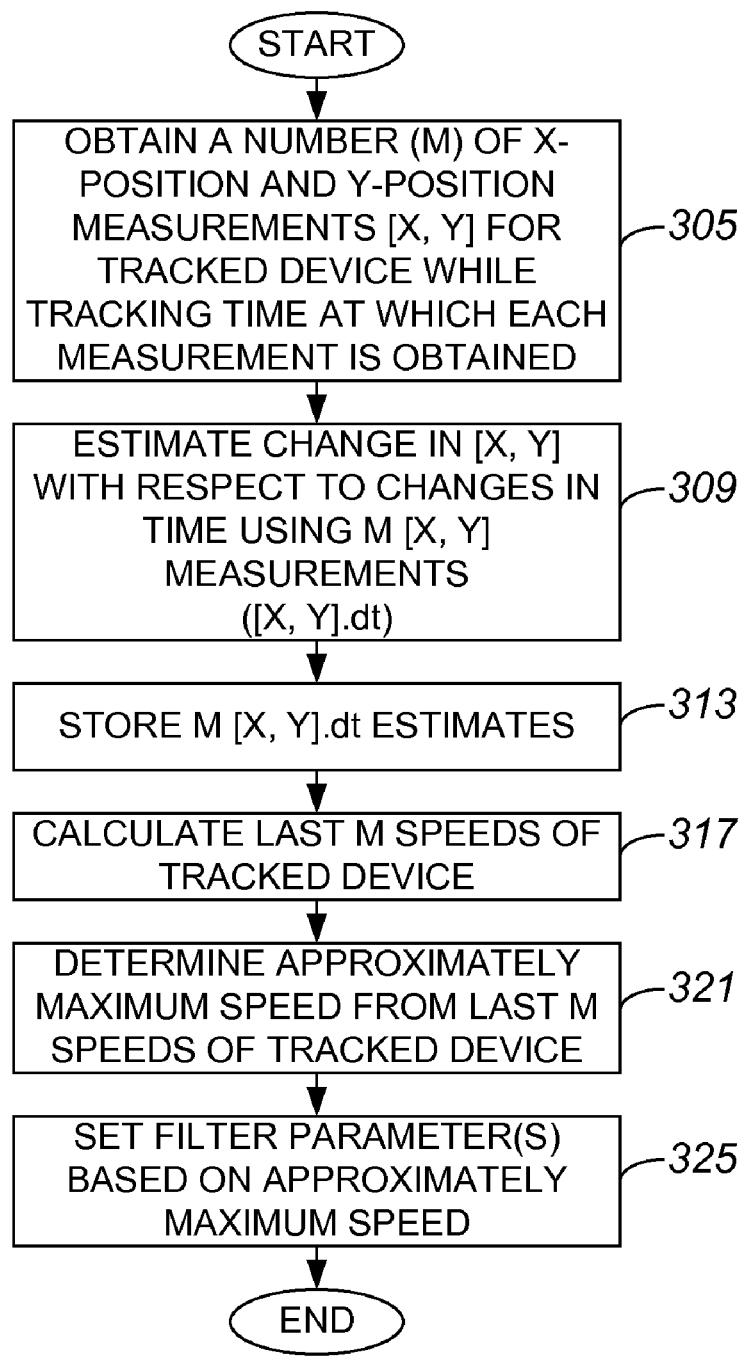
FIG. 3 is a process flow diagram which illustrates a method of processing position measurements associated with a tracked device that is moving in accordance with an embodiment of the present invention.

If a tracked device is identified as being mobile, the position measurements associated with the tracked device may be processed such that a velocity and, hence, a maximum speed of the tracked device may effectively be determined. FIG. 3 is a process flow diagram which illustrates a method of processing position measurements associated with a tracked device, e.g., a device which includes an RF tag, that has been identified as being mobile in accordance with an embodiment of the present invention. A method 301 of processing position measurements associated with a mobile tracked device begins at step 305 in which a number (M) of x-position and y-position measurements for a tracked device are obtained while the time at which each measurement is obtained is also obtained. Hence, M (x, y) position coordinates are obtained and M corresponding time measurements are also obtained.

After the M (x, y) position coordinates and M corresponding time measurements are obtained, changes in the (x, y) position coordinates with respect to changes in time is estimated in step 309. The estimates of changes in (x, y) position coordinates with respect to changes in time is stored in step 313, e.g., in a cache or a data store.

Using the stored estimates of changes in (x, y) position coordinates with respect to changes in time, the last M speeds of the tracked device may be calculated in step 317. Once the last M speeds of the tracked device are calculated, process flow proceeds to step 321 in which the approximately maximum speed of the tracked device is determined from the last M speeds of the tracked device. That is, the highest speed or velocity is identified from amount the last M speeds of the tracked device.

Upon identifying the maximum speed from the last M speeds of the tracked device, one or more filter parameters may be set based on the approximately maximum speed in step 325. One method of setting filter parameters will be discussed below with reference to FIG. 4. Once the one or more filter parameters are set, the method of processing position measurements associated with a mobile tracked device is completed.

Figure 4:
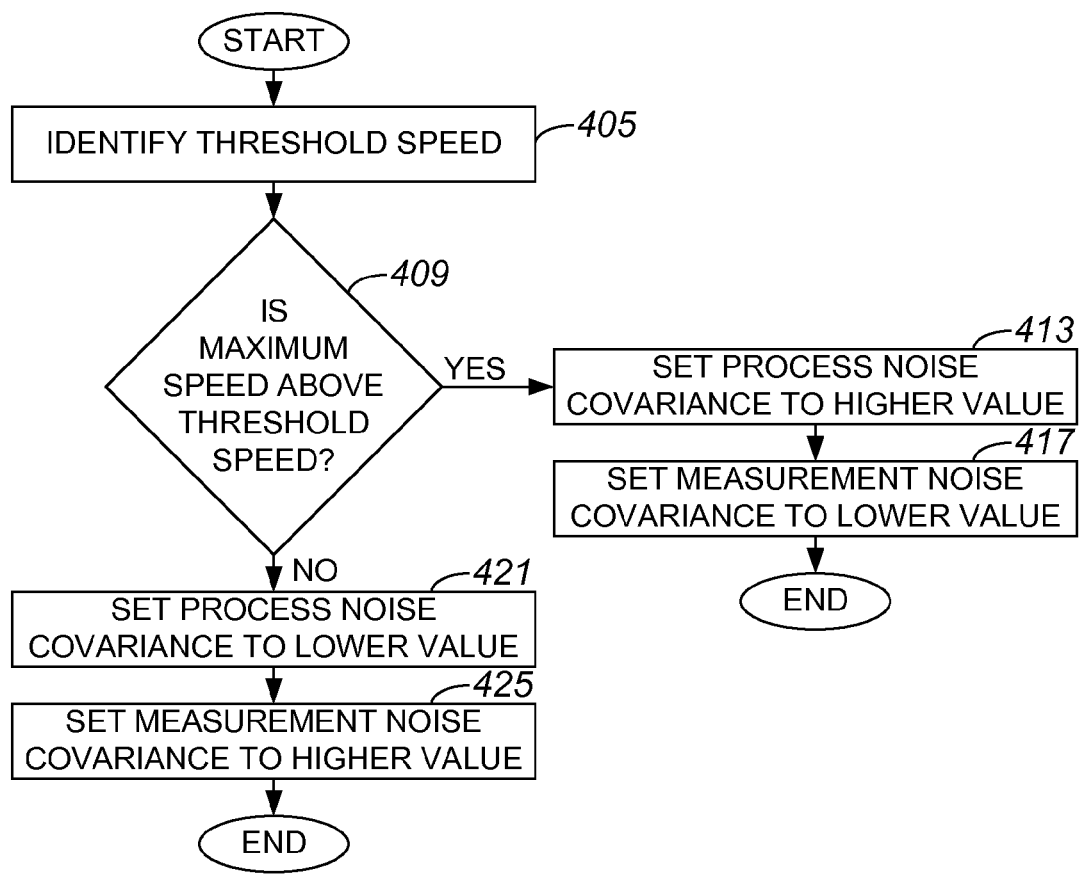
FIG. 4 is a process flow diagram which illustrates a method of setting filter parameters used for location filtering, e.g., step 325 of FIG. 3, in accordance with an embodiment of the present invention.

In general, any suitable filter may be used to process location estimates. As previously mentioned, one suitable filter may be a Kalman filter. FIG. 4 is a process flow diagram which illustrates a method of setting filter parameters used for a Kalman filter, e.g., step 325 of FIG. 3, in accordance with an embodiment of the present invention. A process 325 of setting one or more filter parameters for a Kalman filter begins at step 405 in which a threshold speed is identified. The threshold speed may be set, in one embodiment, to reflect a boundary above which one set of parameter values is used and below which another set of parameter values is used. The threshold speed may be set to be substantially any value that is identified as being suitable.

A determination is made in step 409 as to whether the maximum speed, e.g., the maximum speed selected from the most recent M speeds calculated for the tracked device, is above the threshold speed. In the described embodiment, if the determination is that the maximum speed is above the threshold speed, then the process noise covariance is set to a higher value in step 413. The higher value may be the higher of approximately two possible process noise covariance values. After the process noise covariance is set to the higher value, a measurement noise covariance is set to a lower value, e.g., a lower of approximately two values, in step 417. After the measurement noise covariance is set to the lower value, the process of setting one or more parameters for a Kalman filter is completed.

Returning to step 409, if it is determined that the maximum speed of the tracked device is not above the threshold speed, then the process noise covariance is set to a lower value in step 421. After the process noise covariance is set, the measurement noise covariance is set in step 425 to a higher value. In one embodiment, the higher value is approximately the same value of the measurement noise covariance for a stationary tracked device. Once the measurement noise covariance is set to a higher value, the process of setting one or more parameters for a Kalman filter is completed.

Figure 5:
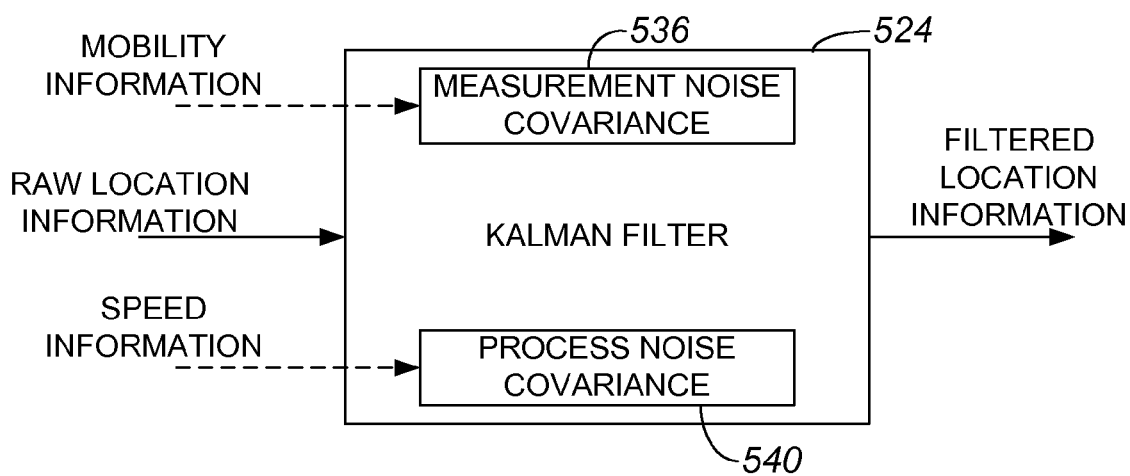
FIG. 5 is a diagrammatic representation of a Kalman filter in accordance with an embodiment of the present invention.

In general, location information and mobility information for a tracked device are provided to a Kalman filter which uses the information to effectively generate filtered location information. If the mobility information indicates that a tracked device is mobile or otherwise likely to be moving, speed information for the tracked device is also provided to the Kalman filter, as discussed above. FIG. 5 is a diagrammatic representation of a Kalman filter in accordance with an embodiment of the present invention. As will be appreciated by those skilled in the art, a Kalman filter 524, which may be implemented as hardware and/or software logic embodied on a tangible media and may effectively be executed by a computing system, utilizes various parameters to filter data such that a mean of a squared error is substantially minimized. Parameters used by Kalman filter 524 may include, but are not limited to including, a measurement noise covariance parameter 536 and a process noise covariance parameter 540.

Kalman filter 524 is configured to obtain raw location information, as for example a location estimate from an RF tag in a tracked device. Kalman filter 524 is further configured to obtain mobility information associated with the tracked device, and to identify or select a value for measurement noise covariance 536 based at least in part on whether the mobility information indicates that the tracked device is stationary or moving. For example, as previously mentioned, a value for measurement noise covariance 536 may be higher for a stationary device and lower for a mobile device. If a tracked device is mobile, Kalman filter 524 may use information regarding the speed of the tracked device to identify or select a value for process noise covariance 540. For example, a value for process noise covariance 536 may be lower for a lower speed and higher for a higher speed.

Using raw location information, mobility information and speed information, as appropriate, Kalman filter 524 may generate or otherwise provide filtered location information. The filtered location information is typically a more accurate indication of a location of a tracked device than indicated by raw location information.

Although only a few embodiments of the present invention have been described, it should be understood that the present invention may be embodied in many other specific forms without departing from the spirit or the scope of the present invention. By way of example, a location tracking system and a tracked device may operate in a variety of different environments. In one embodiment, a location tracking system may be an access point in a building, and a tracked device may be tracked by the location tracking system while within the building. Generally, a location tracking system may be any suitable system which is arranged to effectively monitor an area, and to receive and process signals obtained from a tracked device within the area.

While a device mobility classification has been described as being associated with a two-dimensional classification, a device mobility classification may also be associated with a three-dimensional classification. That is, the mobility of a device may be tracked relative to two dimensions or relative to three dimensions.

Parameters used with respect to a filter such as a Kalman filter have generally been described as having sets of values. For example, one set of values may be used when a device is determined not to be mobile, another set of values may be used when a device is mobile and has a maximum speed below a threshold speed, and yet another set of values may be used when a device is mobile and has a maximum speed above a threshold speed. It should be appreciated, however, that any number of sets of values may be associated with a device that is determined to be mobile. For instance, the values for a process noise covariance and/or a measurement noise covariance may vary as a function of a maximum speed. Hence, for each speed, specific values for process noise covariance and/or measurement noise covariance may be set without departing from the spirit or the scope of the present invention.

A Kalman filter is just one example of a filter with parameters which may be selected based at least in part upon whether a tracked device is moving or not moving. Any suitable filter may generally be used to facilitate location filtering. Further, different filters may be used in location filtering, depending upon whether the tracked device is classified as moving or stationary. For instance, a Kalman filter may be used to perform location filtering if a tracked device is classified as moving, while a different filter may be used to perform location filtering if the tracked device is classified as stationary without departing from the spirit or the scope of the present invention.

A device has generally been described as including an RF tag. It should be appreciated that in lieu of including an RF tag, a device may include substantially any other mechanism or logic which enables a position of the device to be identified. In other words, a location estimate may be determined using data obtained through mechanisms or means other than an RF tag.

A device for which a device mobility classification is determined may generally be any suitable device. For example, a device may be, but is not limited to being, a telephone such as a cellular telephone, a computing device such as a notebook computing device, a personal digital assistant, a portable media player, and/or an identification (ID) tag. In general, a device mobility classification may be determined for substantially any device within which or on which an RF tag or similar device may be incorporated.

The embodiments of the present invention may be implemented as hardware and/or software logic embodied in a tangible medium that, when executed, is operable to perform the various methods and processes described above. That is, the logic may be embodied as physical arrangements or components. For example, a filter such as a Kalman filter may include hardware logic, software logic, or a combination of both hardware and software logic. The tangible medium may be substantially any computer-readable medium that is capable of storing logic which may be executed, e.g., by a computing system, to perform methods and functions associated with the embodiments of the present invention.

The steps associated with the methods of the present invention may vary widely. Steps may be added, removed, altered, combined, and reordered without departing from the spirit of the scope of the present invention. Therefore, the present examples are to be considered as illustrative and not restrictive, and the invention is not to be limited to the details given herein, but may be modified within the scope of the appended claims.

What is claimed is:

1. A method comprising:
    obtaining location information associated with a remote device;
    processing the location information using a processor, wherein processing the location information includes determining if the remote device is mobile;
    configuring a filter such that at least one parameter indicates that the remote device is mobile if it is determined that the remote device is mobile, wherein the filter is a Kalman filter, and wherein the at least one parameter includes a process noise covariance and a measurement noise covariance;
    configuring the filter such that the at least one parameter indicates that the remote device is approximately stationary if it is determined that the remote device is not mobile; and
    applying the filter to the location information to generate a filtered location estimate, the filtered location estimate being arranged to estimate a location of the remote device, wherein configuring the filter such that the at least one parameter indicates that the remote device is mobile if it is determined that the remote device includes determining when an approximately maximum speed of the remote device is above a threshold speed, wherein when the maximum speed is above the threshold speed, the process noise covariance is set to a first value and the measurement noise is set to a second value.

2. The method of claim 1 wherein when the maximum speed is not above the threshold speed, the process noise covariance is set to a third value and the measurement noise is set to a fourth value, the third value being lower than the first value, the fourth value being higher than the second value.

3. The method of claim 1 wherein the location information includes at least one x-position measurement and at least one y-position measurement, and wherein processing the location information includes determining a first line of best fit and a first average value for the at least one x-position measurement, and determining a second line of best fit and a second average value for the at least one y-position measurement.

4. A method comprising:
    obtaining location information associated with a remote device, wherein the location information includes at least one x-position measurement and at least one y-position measurement;
    processing the location information using a processor, wherein processing the location information includes determining if the remote device is mobile, determining a first line of best fit and a first average value for the at least one x-position measurement, and determining a second line of best fit and a second average value for the at least one y-position measurement;
    configuring a filter such that at least one parameter indicates that the remote device is mobile if it is determined that the remote device is mobile;
    configuring the filter such that the at least one parameter indicates that the remote device is approximately stationary if it is determined that the remote device is not mobile;
    applying the filter to the location information to generate a filtered location estimate, the filtered location estimate being arranged to estimate a location of the remote device;
    determining when the at least one x-position measurement deviates less from the first line of best fit than from the first average value, wherein the remote device is mobile when the at least one x-position measurement deviates less from the first line of bets fit than from the average value; and
    determining when the at least one y-position measurement deviates less from the second line of best fit than from the second average value, wherein the remote device is mobile when the at least one y-position measurement deviates less from the first line of bets fit than from the average value.

5. An apparatus comprising:
- means for obtaining location information associated with a remote device;
- means for processing the location information, wherein the means for processing the location information include means for determining if the remote device is mobile;
- means for configuring a filter such that at least one parameter indicates that the remote device is mobile if it is determined that the remote device is mobile, wherein the filter is a Kalman filter, and wherein the at least one parameter includes a process noise covariance and a measurement noise covariance;
- means for configuring the filter such that the at least one parameter indicates that the remote device is approximately stationary if it is determined that the remote device is not mobile; and
- means for applying the filter to the location information to generate a filtered location estimate, the filtered location estimate being arranged to estimate a location of the remote device,
- wherein the means for configuring the filter such that the at least one parameter indicates that the remote device is mobile if it is determined that the remote device include means for determining when an approximately maximum speed of the remote device is above a threshold speed, wherein when the maximum speed is above the threshold speed, the process noise covariance is set to a first value and the measurement noise is set to a second value.

6. Logic encoded in one or more tangible media for execution and when executed operable to:
- obtain location information associated with a remote device;
- process the location information, wherein the logic operable to process the location information is further operable to determine if the remote device is mobile;
- configure a filter such that at least one parameter indicates that the remote device is mobile if it is determined that the remote device is mobile, the filter is a Kalman filter, and wherein the at least one parameter includes a process noise covariance and a measurement noise covariance;
- configure the filter such that the at least one parameter indicates that the remote device is approximately stationary if it is determined that the remote device is not mobile; and
- apply the filter to the location information to generate a filtered location estimate, the filtered location estimate being arranged to estimate a location of the remote device,
- wherein the logic operable to configure the filter such that the at least one parameter indicates that the remote device is mobile if it is determined that the remote device is further operable to determine when an approximately maximum speed of the remote device is above a threshold speed, wherein when the maximum speed is above the threshold speed, the process noise covariance is set to a first value and the measurement noise is set to a second value.

7. The logic of claim 6 wherein when the maximum speed is not above the threshold speed, the process noise covariance is set to a third value and the measurement noise is set to a fourth value, the third value being lower than the first value, the fourth value being higher than the second value.

8. The logic of claim 6 wherein the location information includes at least one x-position measurement and at least one y-position measurement, and wherein the logic operable to process the location information is further operable to determine a first line of best fit and a first average value for the at least one x-position measurement, and to determine a second line of best fit and a second average value for the at least one y-position measurement.

9. Logic encoded in one or more tangible media for execution and when executed operable to:
- obtain location information associated with a remote device, wherein the location information includes at least one x-position measurement and at least one y-position measurement;
- process the location information, wherein the logic operable to process the location information is further operable to determine if the remote device is mobile, to determine a first line of best fit and a first average value for the at least one x-position measurement, and to determine a second line of best fit and a second average value for the at least one y-position measurement;
- configure a filter such that at least one parameter indicates that the remote device is mobile if it is determined that the remote device is mobile;
- configure the filter such that the at least one parameter indicates that the remote device is approximately stationary if it is determined that the remote device is not mobile;
- apply the filter to the location information to generate a filtered location estimate, the filtered location estimate being arranged to estimate a location of the remote device;
- determine when the at least one x-position measurement deviates less from the first line of best fit than from the first average value, wherein the remote device is mobile when the at least one x-position measurement deviates less from the first line of bets fit than from the average value; and
- determine when the at least one y-position measurement deviates less from the second line of best fit than from the second average value, wherein the remote device is mobile when the at least one y-position measurement deviates less from the first line of bets fit than from the average value.

10. An apparatus comprising:
- a transceiver, the transceiver being arranged to obtain estimated location information associated with a device;
- a categorization arrangement, the categorization arrangement being configured to process the estimated location information to determine when the device is mobile, the categorization arrangement further being configured to set at least one parameter based on whether the device is mobile, wherein the categorization arrangement is configured to set a process noise covariance to a first value and a measurement noise covariance to a second value when the device is mobile, and to set the process noise covariance to a third value and the measurement noise covariance to a fourth value when the device is not mobile; and
- a filtering arrangement, the filtering arrangement being configured to use the at least one parameter to filter the estimated location information.

11. An apparatus comprising:
- a transceiver, the transceiver being arranged to obtain estimated location information associated with a device;
- a categorization arrangement, the categorization arrangement being configured to process the estimated location information to determine when the device is mobile, the categorization arrangement further being configured to set at least one parameter based on whether the device is mobile; and a filtering arrangement, the filtering arrangement being configured to use the at least one parameter to filter the estimated location information, wherein the transceiver further includes a radio frequency (RF) tag sensing device, the RF tag sensing device being arranged to obtain the estimated location information from an RF tag of the device.

* * * * *